United States Patent [19]

Iwasaki

[11] 4,371,272

[45] Feb. 1, 1983

[54] THERMODETECTOR

[75] Inventor: Shinichiro Iwasaki, Auburn Heights, Mich.

[73] Assignee: Aisin Seiki Company, Limited, Kariya, Japan

[21] Appl. No.: 182,702

[22] Filed: Aug. 29, 1980

[51] Int. Cl.³ ............................................. G01K 7/38
[52] U.S. Cl. ...................................... 374/184; 336/45
[58] Field of Search ........................ 324/201; 323/362; 73/362 CP, 362 R; 336/30, 45

[56] References Cited

U.S. PATENT DOCUMENTS

| | | | |
|---|---|---|---|
| 2,756,595 | 7/1956 | Rathenau et al. | 73/362 R X |
| 3,054,044 | 9/1962 | Shevel | 73/362 CP X |
| 3,168,830 | 2/1965 | Chass | 73/517 R X |
| 3,484,848 | 12/1969 | Ohlsson | 73/362 CP |
| 3,614,893 | 10/1971 | Nesbitt et al. | 73/362 CP X |
| 3,855,528 | 12/1974 | Brown. | |
| 3,877,314 | 4/1975 | Bernin | 73/517 R |
| 4,045,787 | 8/1977 | Sidor et al. . | |
| 4,085,617 | 4/1978 | Langberg | 73/362 CP |
| 4,140,970 | 2/1979 | Blincoe | 324/208 |

FOREIGN PATENT DOCUMENTS

| | | | |
|---|---|---|---|
| 438489 | 12/1926 | Fed. Rep. of Germany | 73/362 CP |
| 909023 | 10/1962 | United Kingdom . | |
| 1359574 | 7/1974 | United Kingdom | 73/362 CP |

OTHER PUBLICATIONS

"Force & Displacement Transducers Using Single Amorphous Core . . . " By Mohri et al. From EE in Japan, vol. 99, No. 2, 2-79.

Primary Examiner—James J. Gill
Attorney, Agent, or Firm—Oblon, Fisher, Spivak, McClelland & Maier

[57] ABSTRACT

A thermodetector including a ferromagnetic sensor placed on an object to be measured having a magnetic permeability which changes in relation to the temperature, and made of a ferrite material having a measurable change of magnetic permeability in a measuring temperature range. A magnetic flux generator is disposed to apply a magnetic field to the ferromagnetic member and may be a permanent magnet. A magnetically soft member made of a laminated core of thin sheets of amorphous magnetic material is placed within the magnetic field of the magnetic field generator to cooperate with at least the magnetic flux generator to form a magnetic path. An electric coil including a bobbin surrounds the magnetically soft member. The change of magnetic permeability alters the magnetic flux in the magnetically soft member and is sensed by the electric coil to give an indication of temperature.

13 Claims, 13 Drawing Figures

THERMODETECTOR

BACKGROUND OF THE INVENTION

1. Field of the Invention

The present invention relates to a thermodetector for converting temperature into an electrical signal and, more particularly, to a thermodetector incorporating a magnetic field generator such as a permanent magnet and a ferromagnet whose magnetic permeability changes in accordance with a change in temperature to cause a change in magnetic field intensity which is converted to an electric signal.

2. Description of the Prior Art

Generally, a so-called thermodetector has been used for converting a temperature or a temperature change into an electric signal when the temperature is electrically detected for the purpose of displaying the temperature or for use as a signal applied to further apparatus.

Prior art thermodetectors have a temperature sensing element made of a semiconductor or a special ceramic apparatus. Thermocouple type thermodetectors are also known. Thermodetectors having a semiconductor or ceramic temperature sensing element make use of the phenomenon where the electrical resistance of the semiconductor or the ceramic changes in accordance with the change in temperature. A voltage corresponding to the temperature is produced by converting the change in electrical resistance into a change in voltage. In this type of thermodetector, the response of the voltage change to the temperature change is unsatisfactory since the linearity of the voltage change is poor. In addition, the use of a semiconductor or ceramic material as the temperature sensing element causes the thermodetector to be sensitive to vibration and impact.

On the other hand, the thermocouple type temperature detector, which exploits the principle that a thermocouple produces a voltage which corresponds to the temperature, inconveniently requires a cold contact which must be maintained at a constant low temperature. In general, the cold contact is kept in an insulated container containing ice. Thus, either form of thermodetector is impractical since it is either complicated and large in size, or not durable when subjected to vibration and impact.

SUMMARY OF THE INVENTION

Accordingly, one object of this invention is to provide a novel thermodetector which exhibits a good response between an electrical output signal and a temperature change, as well as good linearity and stable charcteristics.

It is another object of the invention to provide a thermodetector having a high resistance to vibration and impact.

It is still another object of the invention to provide a thermodetector in which the electrical processing of the output electric signal, representative of the temperature, is comparatively easy to perform.

It is a further object of the invention to provide a thermodetector in which the read-out of the electrical signal representative of the temperature can be accomplished with comparatively simple read logic in the form of a large-scale integrated circuit having superior electrical processing performance, such as a digital microcomputer.

To this end, according to a first embodiment of the invention, a ferromagnetic member whose magnetic characteristic (magnetic permeability in this invention) changes in response to a change in temperature is placed at a temperature sensing position so as to constitute a major part of the magnetic path. A magnetic field generating means (e.g. a permanent magnet or solenoid) and a magnetically soft member having an electric coil wound therearound are disposed in series with the ferromagnetic member to form a closed magnetic path.

In the second and third embodiment of the invention, the magnetic field generating means and the magnetically soft material having an electric coil therearound are disposed in parallel with the path of magnetism of the ferromagnetic member so as to form a closed magnetic path.

In these embodiments, the ferromagnetic member exhibits a large change in its magnetic characteristic in response to a change in temperature. The change in the magnetic characteristic is useable as a measure of temperature in a range of temperatures. The magnetically soft member has a small cross-sectional area so that magnetic saturation is easily achieved. The number of turns of the coil is selected to be large enough so that the magnetically soft member can be magnetically saturated at a comparatively low voltage, i.e. at a sufficiently low level of electric current. The magnetic field generating means has a capacity large enough to apply a sufficiently strong magnetic field to the magnetically soft member and the ferromagnetic member.

The time t required for the magnetically soft member to saturate from the instant of application of a voltage to a coil around the member is approximated by the following equation (1):

$$t = N/E(\phi_m - \phi_x) \qquad (1)$$

where
E = the voltage applied to the electric coil;
N = the number of turns of the electric coil;
$\phi_m$ = the maximum magnetic flux (approximately equivalent to the saturation flux);
$\phi_x$ = the magnetic flux attributable to external magnetic fields.

As the magnetic characteristic (magnetic permeability) of the ferromagnetic member changes in accordance with a change in temperature, the magnetic resistance of the ferromagnetic member changes, so that there is an increase or decrease in the magnetic flux from the magnetic field generating means passing through the magnetic path including the ferromagnetic member. This causes a change in the external magnetic flux $\phi_x$ applied to the magnetically soft member, so that the amount of flux generated by the coil before reaching the maximum magnetic flux, $\phi_m$, is reduced. Thus, there is a change in the passable magnetic flux (the magnetic flux which can pass through the magnetically soft member until the maximum magnetic flux is attained). Consequently, there is a change in the time t required for reaching the level of electric current necessary to produce this amount of flux following the application of voltage to the coil.

It is possible to ascertain the temperature or the temperature change by measuring this time t. The thermodetector of the invention, therefore, is connected to an electrical circuit or a semiconductor device which is adapted to measure the time t and to display the temperature in response to an electrical signal such as a voltage level, a digital code or the like.

In a preferred embodiment of the invention, an amorphous magnetic material is used to form the magnetically soft member. It is difficult to obtain the amorphous magnetic material in the form of a mass, because it is produced by quenching a liquid phase metal, so it is usually formed as a thin sheet. In addition, the amorphous material is ferromagnetic and has a high magnetic permeability ($\mu_{max} > 10^3$) and high level of magnetic saturation, while the level of the coercive force is low (<1.0 Oe). As to mechanical properties, this material exhibits an extremely high break strength, and superior resiliency and stability. These properties are preferred for use in a thermodetector of the present invention. The use of this material offers various advantages. It facilitates signal processing and improves accuracy in the measurement of the time length t. It also simplifies manufacture and lowers manufacturing costs. Furthermore, the resistance to vibration and impact is greatly increased. Some magnetically soft materials are described in Hasegawa et al, "Soft Magnetic Properties of Metallic Glasses—Recent Developments", J. Appl. Phys. 50(3), March, 1979, pp. 1551-1556. Magnetically soft materials are sold under the trademark Metglas (TM) by Allied Chemical Corp.

Moreover, in a preferred embodiment of the invention, the ferromagnetic member is made of ferrite, temperature-sensitive ferrite or an aligned magnetic alloy which exhibits a large change in its magnetic characteristic in relation to the temperature and, hence, a wide range of measurable temperature. Such a material is highly preferred for use as the material of the thermodetector of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4b is a graph showing the waveforms of the input and output signals of the circuit shown in FIG. 4a;

FIG. 8b is a graph showing the waveforms of the input and output signals of the circuit shown in FIG. 8a;

DESCRIPTION OF THE PREFERRED EMBODIMENTS

Figure 1:
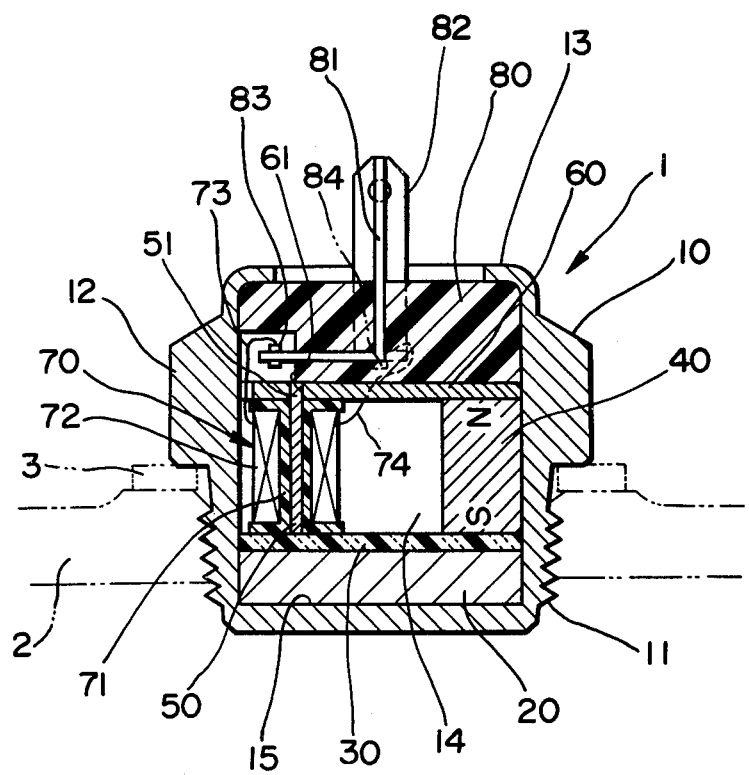
FIG. 1 is a longitudinal cross-sectional view of a thermodetector constructed in accordance with a first embodiment of the invention.

Referring now to the drawings, wherein like reference numerals designate identical or corresponding parts throughout the several views, and more particularly to FIG. 1 thereof, a thermodetector in accordance with the invention is generally designated by reference numeral 1. The thermodetector 1 is fixed by screwing it into an object whose temperature is to be measured (referred to as a temperature measurement portion, hereinafter) such as an engine block, a cooling water pipe, exhaust pipe or the like of a vehicle engine. Reference numeral 3 designates a commonly used gasket which is effective also as a heat insulating material. The thermodetector 1 has a body 10 made of a non-magnetic material such as copper alloy. A tapered screw thread 11, hexagonal head 12 and a thin-walled opening 13 are formed on the outside of the body. The body 10 is hollow and has an internal cavity 14. A ferromagnetic member 20 formed of ferrite material, a temperature sensitive ferrite material, an aligned magnetic alloy or the like is seated on the inner bottom 15 of the internal cavity 14. This ferromagnetic member 20 exhibits a large change in magnetic characteristic when subjected to a change in temperature, and has a characteristic useable as a measure of temperature in the desired temperature range. For instance, a ferrite material having a characteristic shown in FIG. 2 can be used as the ferromagnetic member 20. The temperature-sensitive ferrite should have a curie point (Tc) falling within the practical temperature range and should exhibit a magnetic secondary phase transition phenomenon. The curie point Tc can be varied as desired by changing the composition of the material. For instance, oxides of Mn-Zn-Fe alloy, Ni-Zn-Fe alloy and so forth are useable in practice. FIG. 3 shows examples of temperature characteristics of temperature-sensitive ferrites having different curie points.

A shield plate 30 made of a non-magnetic and heat-insulating material such as ceramic is disposed on the ferromagnetic member 20 in contact with the latter.

Disposed above the shield plate 30 are a permanent magnet 40 as the magnetic field generating means and a magnetically soft material 50 which are upright and parallel to each other. The upper end 51 of the magnetically soft member 50 is received by a bore 61 formed in a magnetic member 60 bridging the magnetic field generating means 40 and the magnetically soft member 50. The magnetic field generating means 40, ferromagnetic member 20, magnetically soft member 50, magnetic member 60 and again the magnetic field generating means 40 are arranged annularly in series to form a closed magnetic loop. Although the magnetic field generating means may be either a permanent magnet or a solenoid, a permanent magnet is preferred.

The magnetically soft member 50 has a construction of a laminated core constituted by a plurality of sheets, each having a thickness of 0.05 mm and superposed in layers. An amorphous iron-nickel alloy having a composition of 40 wt% Fe, 38 wt% Ni, 4 wt% Mo and 18 wt% B or a composition of 40 wt% Fe, 40 wt% Ni, 14 wt% P and 6 wt% B is preferred as the material of the magnetically soft member 50.

Alternatively, a laminated core structure constituted by two or three sheets, each being 0.2 to 0.1 mm in thickness, of a nickel-iron alloy such as $\mu$ -metal having a composition of 80 wt% Ni, 16 wt% Fe and 4 wt% Mo or superpermalloy having a composition of 80 wt% Ni and 20 wt% Fe may be used as the magnetically soft material. The symbol wt% when used herein refers to atomic weight percentage.

A coil member 70 is disposed around the magnetically soft member 50. This coil member has an electric coil 72 of about 1000 turns wound around a bobbin 71. Thus, the member 50 constitutes a core of the coil member. Both ends 73, 74 of the coil 72 are connected to terminals 83, 84 of leads 81, 82 which are isolated from one another by an insulating member 80, such as a material sold under the trademark Bakelite (TM).

The ferromagnetic member 20, shield member 30, magnetic field generating means 40, magnetically soft member 50, magnetic member 60, coil member 70 and the insulating member 80 are accommodated within the internal cavity 14 of the body 10. The thin walled opening 13 is roll-caulked so that the thermodetector as a whole is assembled as a tapered screw-type thermodetector having a hexagonal head.

Figure 2:
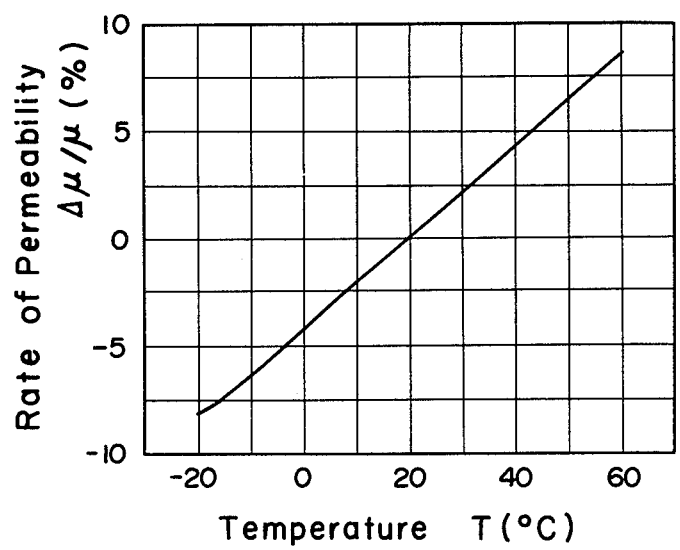
FIG. 2 is a graph showing how the magnetic chracteristic (magnetic permeability) of a ferrite material, which is used as the material of the ferromagnetic member incorporated in the thermodetector of the invention, varies in accordance with a change in temperature.
Figure 3:
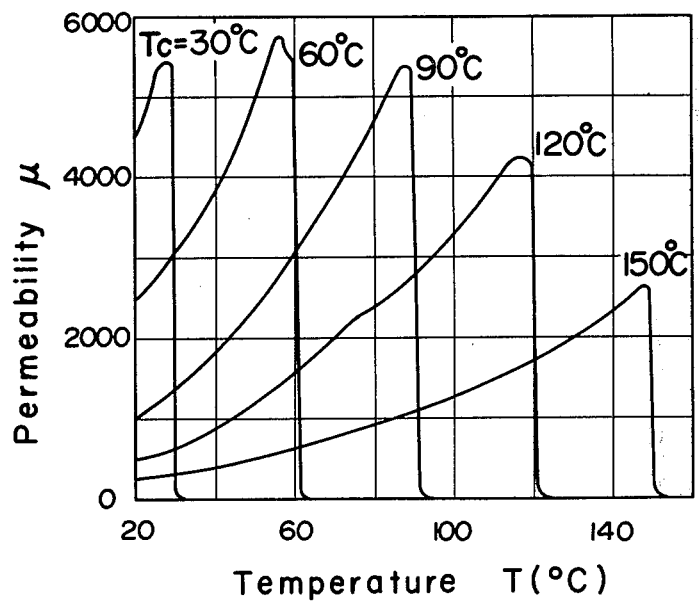
FIG. 3 is a graph showing how the magnetic characteristic (magnetic permeability) of temperature-sensitive ferrite, which is used as the material of the ferromagnetic member incorporated in the thermodetector of the invention, varies in accordance with a change in temperature.

In the above-described construction, as the temperature at the temperature measurement portion 2 changes to cause a rise in the temperature T of the ferromagnetic member 20, the magnetic permeability $\mu$ of the latter is increased following the characteristic curve shown in FIGS. 2 and 3.

As a result, the magnetic resistance in the magnetic path in the ferromagnetic member 20 decreases so that there is an increase in the magnetic flux generated by the magnetic field generating means 40 and passing through the above-mentioned path. Consequently, the magnetic flux (external flux $\phi_x$) passing through the magnetic path of the magnetically soft member 50 is also increased to reduce the passable magnetic flux in the path of the magnetically soft member 50, i.e. the difference between the maximum magnetic flux $\phi_m$ in the magnetically soft member and the external magnetic flux $\phi_x$. Thus, the passable magnetic flux varies in inverse proportion to the temperature change. It is possible to determine the temperature T by converting the change in passable magnetic flux into an electrical signal.

Figure 4A:
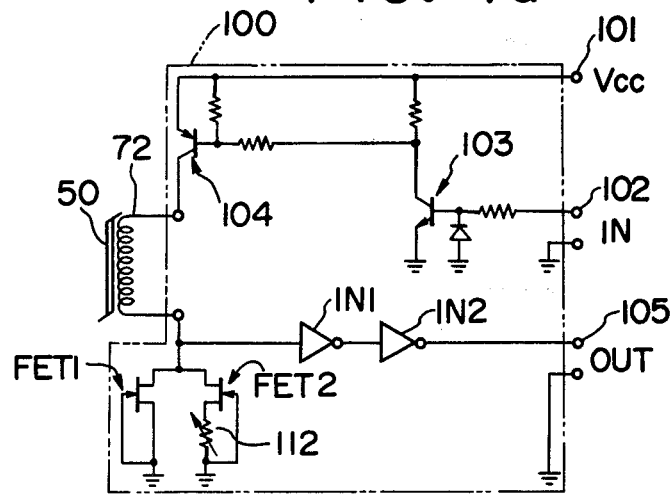
FIG. 4a is a circuit diagram of an electrical processing circuit connected to a thermodetector of the invention and adapted to convert the passable magnetic flux into an electrical signal and to produce pulses indicative of a time lag corresponding to the temperature.

In order to convert the passable magnetic flux into an electrical signal, an electrical processing circuit 100 as shown in FIG. 4a is used. A constant D.C. voltage, e.g. +5 V, is applied to a constant voltage terminal 101 of the circuit 100. An input terminal 102 receives a voltage pulse having a frequency of, for example, 5 to 25 KHz.

NPN transistor 103 and PNP transistor 104 are in the on state, during the time that the input voltage IN is at the positive level, so that a constant voltage is applied to the coil 72. NPN transistor 103 and PNP transistor 104 are in the off state, during the time that the input voltage IN is at ground level. The supply of electric current to the coil is made through a junction type N channel FET1 and FET2 connected in a constant current configuration, so as to be kept constant by these transistors FET1 and FET2. The level of current flowing through the transistor FET2 is set by a variable resistor 112. The voltage at the terminal of the coil connected to the FET1 and FET2 is amplified and shaped by inverter amplifiers IN1 and IN2.

Figure 4B:
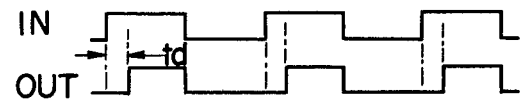
Figure 6:
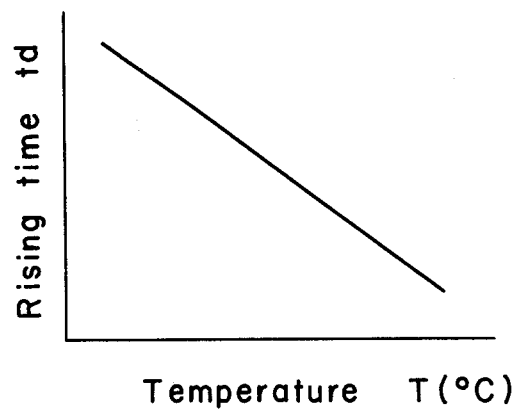
FIG. 6 is a graph showing the relationship between the time lag between the input and output pulses of the circuit shown in FIG. 4a and the temperature change.

The output (OUT) at the terminal 105 of the circuit 100 is a voltage pulse which rises after the input pulse IN with a time lag, td, as will be seen from FIG. 4b, and corresponds to the change in temperature T, as will be seen from FIG. 6. This rise time, td, changes in proportion to the passable magnetic flux ($\phi_m - \phi_x$), as will be seen from equation (1).

Figure 5:
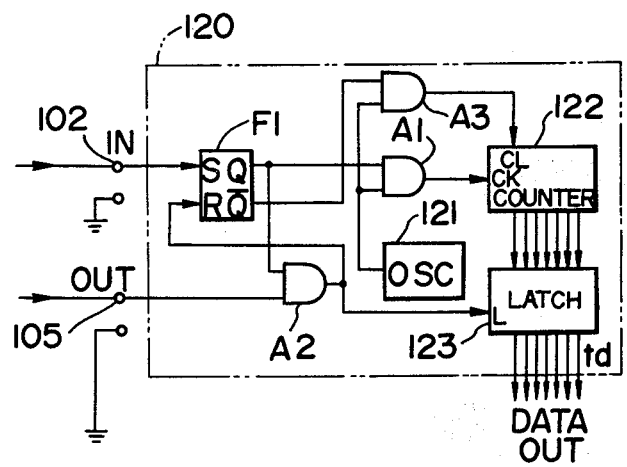
FIG. 5 is a block diagram of a counter circuit for converting a time lag between an input and an output pulse, from the circuit of FIG. 4a, into a digital code.

This rise time is represented as a digital code produced by a counter circuit 120 shown in FIG. 5. In this counter circuit 120, a flip-flop F1 is set by the rising side of the input voltage IN so that the Q output of the flip-flop F1 goes to a high level "1" to open the AND gate A1, thereby permitting the pulse generated by a clock pulse oscillator 121 to be applied to the count pulse input terminal CK of the counter 122. An output pulse OUT and the Q output of the flip-flop F1 are applied to an AND gate A2, the output of which goes to the high level "1" as the output pulse OUT rises to a high level. The flip-flop F1 is reset at this time so that the output Q reverts to the low level "0". This closes the AND gate A1 to interrupt the transmission of clock pulses to the counter 122. When the output from the AND gate A2 rises to level "1", the count code of the counter 122 is stored in a latch 123. After the flip-flop F1 is reset and the latch 123 has been loaded with the count code, an AND gate A3 passes a clock pulse so as to clear the counter 122. The output code $t_d$ from the latch 123 indicates the number of clock pulses passed during the time interval $t_d$, and hence represents the aforementioned time difference $t_d$.

Figure 7:
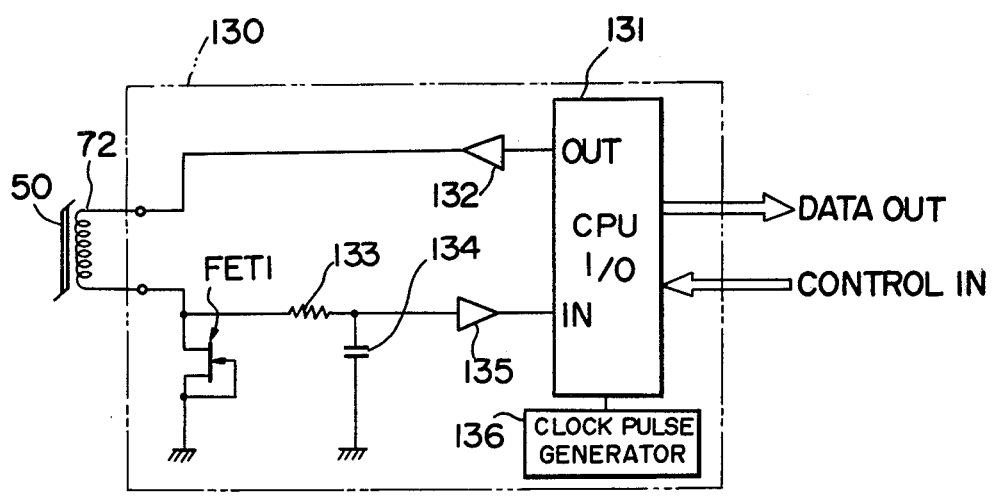
FIG. 7 is a block diagram of an electronic processing unit connected to the thermodetector of the invention and having a one-chip microcomputer adapted to convert the passable magnetic flux of the magnetically soft member into an electrical signal and to count the delay time of the time lag pulses corresponding to the temperature.

It is possible to digitally code the passable magnetic flux ($\phi_m - \phi_x$), and hence the temperature T, by using an electronic processing unit 130 as shown in FIG. 7, in place of the circuits 100 and 120 shown in FIGS. 4a and 5.

The unit 130 comprises a single chip micro-computer (a large scale integrated semiconductor device) 131, amplifier 132, junction type N-channel FET 1 for control of constant current, resistor 133, capacitor 134, amplifier 135 and a clock pulse generator 136. The resistor 133 and the capacitor 134 constitute a filter which removes voltage oscillations of frequencies higher than that of the input and output pulses. The microcomputer 131 forms a pulse train of a constant frequency ranging between 5 KHz and 30 KHz in response to clock pulses, and delivers the same to the amplifier 132. At the same time, the microcomputer 131 monitors the voltage developed at the junction between the N-channel FET 1 and the coil 72 (as represented by the output voltage of the amplifier 135) and counts the clock pulses which are developed during the time from the rising edge of the pulse generated by the microcomputer itself to the moment at which the output voltage of the amplifier 135 rises, thereby to produce a coded output indicative of the time difference $t_c$ (DATA OUT).

Figure 8A:
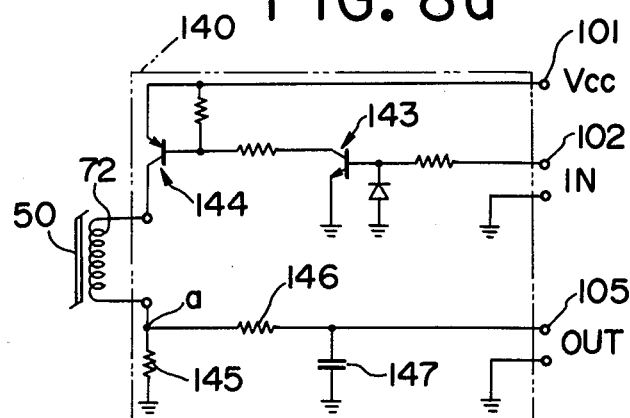
FIG. 8a is a circuit diagram of an electrical processing circuit connected to a thermodetector of the invention and adapted to convert the passable magnetic flux of the magnetically soft material into an electrical signal and to produce an analog voltage corresponding to the temperature.

An electric processing circuit 140 as shown in FIG. 8a can be used for detecting and converting the passable magnetic flux into voltage. A D.C. voltage (e.g. +5 V) is applied to the constant voltage source terminal 101 of the circuit 140. The input terminal 102 receives a voltage pulse of, for example, 5 to 25 KHz. The NPN transistor 143 is turned on during the time that the voltage is positive, and is not allowed to conduct during the time that the voltage pulse is at ground level. The PNP transistor 144 is on when the transistor 143 is on, and is off when the transistor 143 is off. Therefore, a constant voltage Vcc is applied to electric coil 72 during the time that the voltage pulse applied to input terminal 102 is at the positive level, and no voltage is applied to the electric coil during the time that the input voltage pulse is at ground level. A voltage proportional to the current supplied to coil 72 appears across the resistor 145, which then is integrated by an integrated circuit consisting of resistor 146 and capacitor 147. The integrated output is derived from the output terminal 105.

Figure 8B:
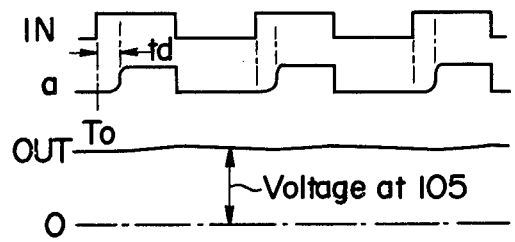

A relationship as shown in FIG. 8b exists between the time $t_d$, measured from the rise of the input voltage IN to a positive level to the rise in the voltage across the resistor 145 to a predetermined level, and the integrated voltage Vx of the voltage a appearing across the resistance 145.

Figure 9:
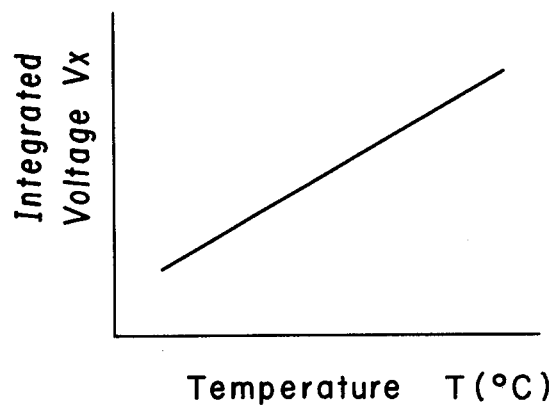
FIG. 9 is a graph showing the relationship between the change in the output voltage of the circuit shown in FIG. 8a and the change in temperature.

The rise time, $t_d$, corresponds to the change in the temperature T as will be seen from FIG. 6, and the integrated voltage Vx corresponds to the change in the temperature T as shown in FIG. 9.

As has been described, according to the first embodiment of the invention, it is possible to determine the temperature change easily by converting the change in the passable magnetic flux into an electrical signal by an electrical processing circuit or a logical electronic processing circuit connected to the thermodetector 1 shown in FIG. 1.

When the temperature-sensitive ferrite having the characteristic as shown in FIG. 3 is used as the material for the ferromagnetic member, the magnetic permeability $\mu$ is drastically changed in the area around the curie point Tc. It is possible to obtain a constant temperature switch having a simple electric circuit adapted to detect this change in the magnetic permeability.

Figure 10:
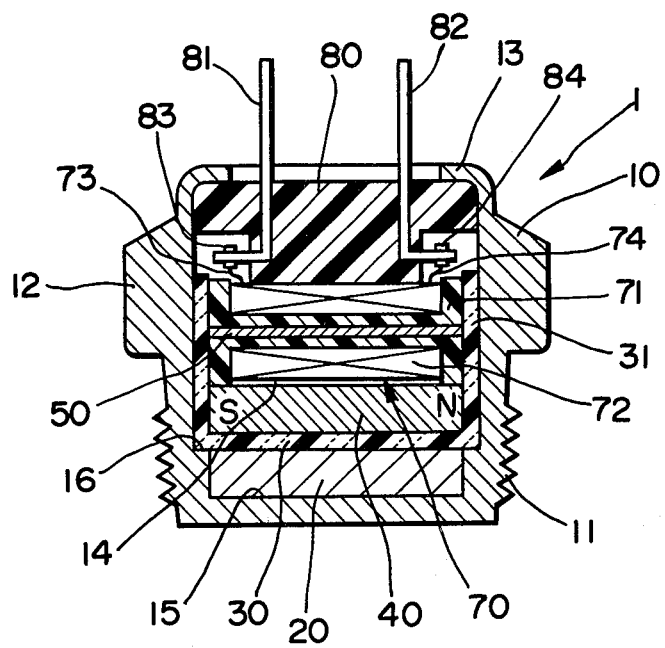
FIG. 10 is a longitudinal cross-sectional view of another thermodetector constructed in accordance with another embodiment of the invention.

FIG. 10 shows another embodiment of the invention. The description of this embodiment will focus only on the points which differ from the first embodiment.

Seated on the inner bottom surface 15 of the internal cavity 14, is the ferromagnetic member 20 on which a shield plate 30 is disposed in contact with a shoulder 16. The shield plate 30 has a wall 31 extending upwardly therefrom. The magnetic field generating means 40 and the magnetically soft member 50 are arranged in parallel so that a first magnetic path consisting of the magnetic generating means 40, ferromagnetic member 20 and again the magnetic field generating means, and a second magnetic path consisting of magnetic field generating means 40, magnetically soft member 50, and the magnetic field generating means 40, are formed in parallel with each other.

A coil member 70 is disposed around the magnetically soft member 50, in which an electric coil 72 is wound around a bobbin 71. The coil 72 is connected at both of its ends 73, 74 to the terminals 83, 84 of leads 81, 82 which are spaced from each other by an insulating member 80.

In operation, a change in temperature, e.g. a temperature rise in the ferromagnetic member 20, causes an increase in the magnetic permeability $\mu$ of the ferromagnetic member 20. As a consequence, the magnetic resistance in the magnetic path through the ferromagnetic member 20 is decreased to cause an increase in the magnetic flux flowing from the magnetic field generating means 40 through the first magnetic path, so that the magnetic flux through the second magnetic path is decreased provided that the intensity of the magnetic field of the magnetic field generating means 40 is constant. Thus, the magnetic flux (external magnetic flux $\phi_x$) passing through the magnetically soft member 50 is decreased to increase the passable magnetic flux ($\phi_m - \phi_x$) in the magnetic path in the magnetically soft member 50. This passable magnetic flux is proportional to the temperature change. It is possible to determine the temperature change by converting this passable magnetic flux into an electrical signal in the manner explained in connection with the first embodiment. In this case, the rise time $t_d$ is proportional to the temperature T, in contrast to the situation in the first embodiment in which, as shown in FIG. 6, the rise time $t_d$ is in inverse proportion to the temperature T. Also, an inverse proportion to that shown in FIG. 9, i.e. a proportional relationship, exists between the temperature T and the integrated voltage, Vx.

Figure 11:
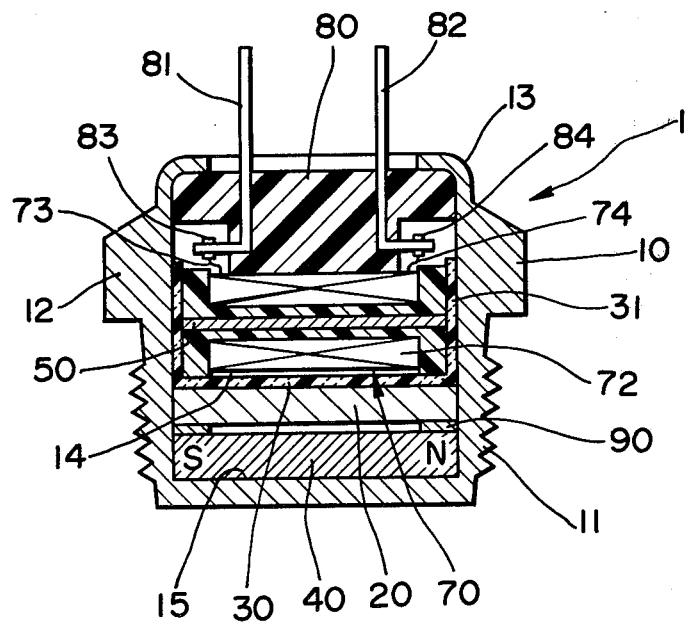
FIG. 11 is a longitudinal cross-sectional view of a modification of the thermodetector shown in FIG. 10.

FIG. 11 shows a modification of the embodiment shown in FIG. 10. In this modification, the ferromagnetic member 20 is interposed between the magnetic field generating means 40 and the magnetically soft member 50, and a spacer 90 is interposed between the ferromagnetic member 20 and the magnetic field generating means 40. The shield plate 30 is disposed above the ferromagnetic member 20. According to this arrangement, since the magnetic field generating means is disposed at the temperature measurement portion, the permanent magnet, if it is used, should be one in which the magnetic field does not vary due to a temperature rise. For instance, a magnet of ALNICO 5 system (U.S.A. MMPA standard), having a comparatively high curie point of Tc=890° C., is preferable.

In this thermodetector, it is possible to determine the temperature by converting the passable magnetic flux into an electrical signal in the same manner as that shown in FIG. 10. The relationship between the temperature T and the rise time $t_d$, as well as the relationship between the temperature T and the integrated voltage Vc, is substantially equivalent to that shown in FIG. 10, so that the detailed description is omitted here.

In the embodiments and modification described hereinbefore, the ferromagnetic member 20, magnetic field generating means 40 and the magnetically soft member are elongated members having a polygonal cross-section with the longitudinal axes extending in the left and right directions as viewed in the drawings. The ferromagnetic member 20 and the magnetic field generating means 40, however, can have a columnar shape with a circular cross-section. The shape of the internal cavity 14 is suitably determined so as to be convenient for accommodating the above members. The positions of the ferromagnetic member 20 and the magnetically soft member 50 are so determined in relation to the magnetic field generating means 40 as to form the magnetic path within the range of the magnetic field generated by the magnetic field generating means 40.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A thermodetector comprising:
   a ferromagnetic member disposed on an object whose temperature is to be measured and having a magnetic characteristic which changes in response to a change in temperature;
   means for generating a magnetic field coupling said ferromagnetic member;
   a magnetically soft core member thermally isolated from said ferromagnetic member and also coupling the magnetic field generated by said means for generating a magnetic field;
   an electric coil wound around said magnetically soft core member;
   wherein a magnetic circuit is formed, including at least said means for generating a magnetic field, said ferromagnetic member and said magnetically soft core member;
   detector means for detecting a change of intensity of magnetic flux produced in said core member by the magnetic field of said permanent magnet means in response to a thermally induced change in the magnetic characteristic of said ferromagnetic member, comprising,
   means for applying a pulse voltage to said at least one coil, and
   means for measuring the time delay occurring from the application of said pulse voltage until saturation of said core means;
   wherein a change in temperature causes a change in said magnetic characteristic of said ferromagnetic member which in turn causes a change in the amount of flux coupling said core member which is detected by said detector means.

2. A thermodetector as claimed in claim 1, wherein said magnetically soft core member is an amorphous material.

3. A thermodetector as claimed in claim 1, further comprising:
   said ferromagnetic member, said means for generating a magnetic field and said magnetically soft core member being disposed annularly in series so that they cooperate with one another in forming a closed magnetic path.

4. A thermodetector as claimed in claim 3, wherein said magnetically soft core member is an amorphous material.

5. A thermodetector as claimed in claim 4, wherein said magnetic field generating means comprises a permanent magnet.

6. A thermodetector according to claim 1, wherein said detection means comprises:
   constant current source means for producing a constant current through said coil upon application of said pulse voltage thereto;
   wherein said pulse voltage applying means and said constant current source means product at a terminal of said coil a voltage signal delayed after application of said pulse signal in relation to the temperature being measured.

7. A thermodetector as claimed in claim 6, further comprising:
   said ferromagnetic member, said magnetic field generating means and said magnetically soft member being disposed so that said magnetic field generating means and said ferromagnetic member cooperate with each other to form a first magnetic path, while said magnetic field generating means and said magnetically soft member cooperate with each other to form a second magnetic path parallel to said first magnetic path.

8. A thermodetector as claimed in claim 7, wherein said magnetically soft core member is an amorphous material.

9. A thermodetector as claimed in claim 8, wherein said magnetic field generating means comprises a permanent magnet.

10. A thermodetector as claimed in claim 7, wherein said magnetic field generating means and said magnetically soft core member are thermally isolated from said ferromagnetic member.

11. A thermodetector as claimed in claim 7, wherein said ferromagnetic member and said magnetic field generating means are thermally isolated from said magnetically soft core member.

12. A thermodetector as claimed in claim 1, further comprising:
    an insulator member interposed between said ferromagnetic member and said magnetically soft core member for thermally isolating said magnetically soft core member against temperature transfer from the object whose temperature is to be measured.

13. A thermodetector comprising:
    a ferromagnetic member disposed on an object whose temperature is to be measured and having a magnetic characteristic which changes in response to a change in temperature;
    means for generating a magnetic field coupling said ferromagnetic member;
    a magnetically soft core member thermally isolated from said ferromagnetic member and also coupling the magnetic field generated by said means for generating a magnetic field;
    an electric coil wound around said magnetically soft core member;
    wherein a magnetic circuit is formed, including at least said means for generating a magnetic field, said ferromagnetic member and said magnetically soft core member;
    wherein a change in temperature causes a change in said magnetic characteristic of said ferromagnetic member which in turn causes a change in the amount of flux coupling said core member which is sensed by said electric coil;
    said ferrogmagnetic member, said magnetic field generating means and said magnetically soft member being disposed so that said magnetic field generating means and said ferromagnetic member cooperate with each other to form a first magnetic path, while said magnetic field generating means and said magnetically soft member cooperate with each other to form a second magnetic path parallel to said first magnetic path.

* * * * *

UNITED STATES PATENT AND TRADEMARK OFFICE
CERTIFICATE OF CORRECTION

PATENT NO. : 4,371,272
DATED : February 1, 1983
INVENTOR(S) : Shinichiro Iwasaki It is certified that error appears in the above—identified patent and that said Letters Patent is hereby corrected as shown below:

In column 7, line 24, change the second occurrence of "integrated" to --integration--;

In column 10, line 3, change "6" to --1--;

In column 10, line 58, change "ferrogmagnetic" to --ferromagnetic--.

Signed and Sealed this

Seventeenth Day of May 1983

[SEAL]

Attest:

DONALD J. QUIGG

Attesting Officer

Acting Commissioner of Patents and Trademarks